Feb. 24, 1925.
L. A. APPLEBY
1,527,533
TRANSMISSION BAND LINING
Filed May 31, 1923
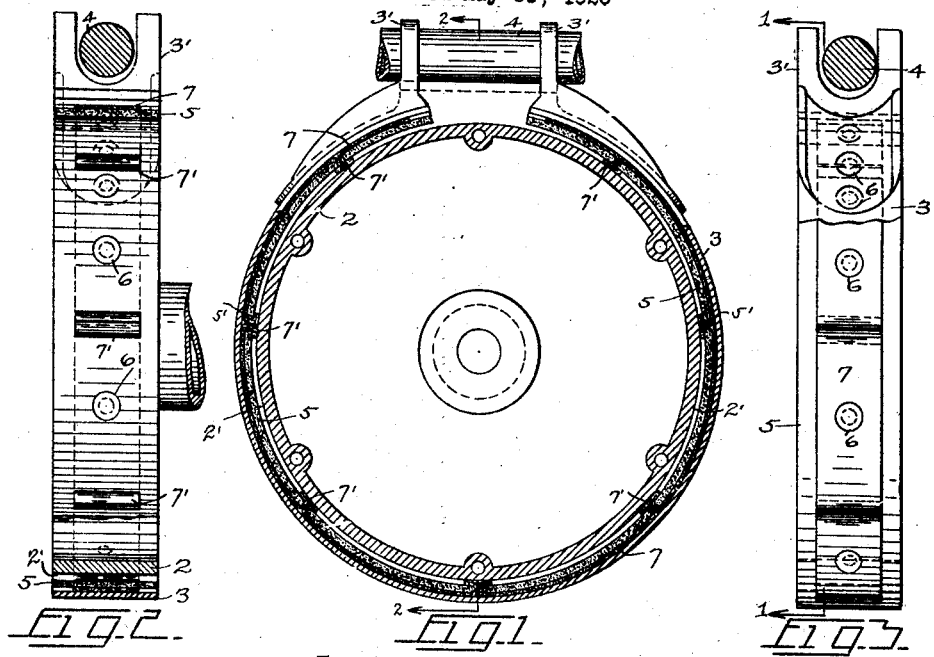
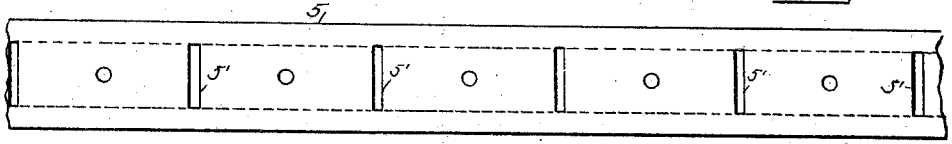
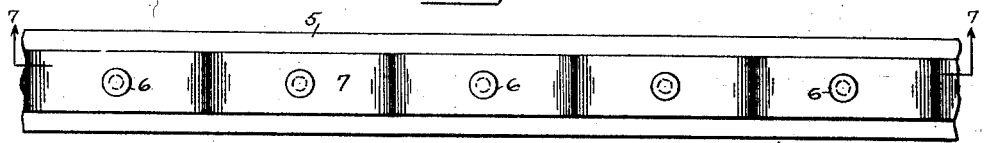
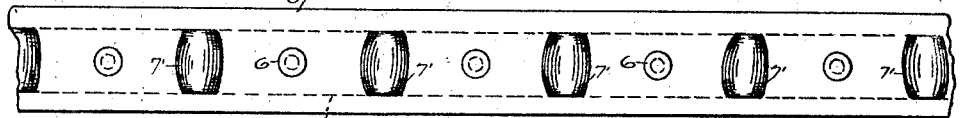
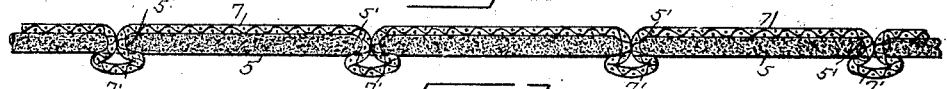
Inventor
Leslie A. Appleby.
By Harry D. Wallace
Attorney Patented Feb. 24, 1925.

1,527,533

UNITED STATES PATENT OFFICE.

LESLIE A. APPLEBY, OF SYRACUSE, NEW YORK.

TRANSMISSION-BAND LINING.

Application filed May 31, 1923. Serial No. 642,485.

*To all whom it may concern:*

Be it known that I, LESLIE A. APPLEBY, a citizen of the United States, residing at Syracuse, in the county of Onondaga and State of New York, have invented certain new and useful Improvements in Transmission-Band Linings, of which the following is a specification.

This invention relates to improvements in transmission bands of automobiles, and the like, and more particularly to novel simple and effective means for lubricating the transmission drums at the points where the bands frictionally engage the drums.

The primary object of the invention is to prevent the linings, which are usually made of asbestos or cotton, from burning and glazing, due either to the lack of sufficient lubrication, or to the uneven distribution of the lubricating medium, which invariably causes chattering, and loss of the gripping power of the bands, as well as the rapid wearing out of the band linings. A further object is to provide wicks, by means of which the lubricating oil may be continuously and evenly applied to the peripheral surfaces of the transmission drums, the said wicks being woven through the lining in a manner to simultaneously apply the lubricant at several points in the circumference of the drums, thereby obviating the danger of the linings becoming dried-out, burned, or glazed, due to the heat of friction, as heretofore. And a further object is to provide means whereby the lubricant may be distributed to the inner and outer surfaces of the band-linings, as well as to the drums, by a single wick.

I attain these objects by the means set forth in the detailed description which follows, and as illustrated by the accompanying drawing, in which—

Figure 1 is a transverse vertical section, taken on line 1—1 of Fig. 3. Fig. 2 is a longitudinal section, taken on line 2—2 of Fig. 1. Fig. 3 is a view of one of the transmission bands, with parts broken away for showing the lining and wick in elevation. Fig. 4 is a broken plan view of an asbestos lining, showing slots for applying the wick. Fig. 5 is an outer face view of the lining and wick. Fig. 6 is an inner face view of the same, and Fig. 7 is a longitudinal section, taken on line 7—7 of Fig. 5.

In the drawing, 2 represents one of the drums, of a well-known planetary transmission gearing. 3 is the usual split circular clamping band, which is positioned concentrically over the drum, and usually comprises a relatively thin strip of flexible spring metal, whose spaced ends are fitted with forked lugs 3', which are engaged by a rod 4, for effecting the clamping operations, in a well-known manner. The inner face of the band 3 is usually lined with a strip of non-metallic or fibrous material 5, such as asbestos, cotton, or the like, which is usually secured to the band by rivets 6, as shown in Figs. 2, 3, 5 and 6. The lining 5, has heretofore been arranged to directly and frictionally engage the periphery 2' of the drum 2, when the band is contracted for clamping the drum. The relatively soft and pliable lining 5 is employed because it is more adhesive and affords a more positive grip of the drum, than the bare metal band, and when worn out, the said lining may be readily and cheaply replaced. The fibrous lining 5 is of such nature that it readily absorbs and becomes more or less saturated with the lubricating oil, which tends to prolong the life of both the lining and band. Ordinarily the transmission drum 2 and related parts are operated in a body of oil, or else the lubricant is splashed upon the said parts, in a well-known manner, during the operation of the vehicle. But it frequently happens that the meeting surfaces of the drum and lining fail to receive the proper amount of the oil, and the lining, due to the heat of friction, becomes dried-out and glazed to an extent that causes the band to chatter and vibrate violently, whenever the gripping pressure is applied. This tendency to chatter not only materially lessens the gripping power of the bands during the setting of the brakes and the shifting of the speed gears comprising the transmission mechanism, but also causes unnecessary wear and tear of the transmission and other parts of the vehicle.

It is a particular object of the present invention to remedy all of the aforesaid defects, by providing novel and simple means for effecting the continuous and even distribution of the lubricating oil over the meeting faces of the drum and band-linings. To this end, I provide each band of the transmission mechanism with a lining 5, which is preferably made of asbestos, because of its great resistance to heat, and to the outer face of said lining I apply a flat wick 7, which is preferably made of felt, or like absorbent material. The wick 7 is preferably somewhat narrower than the band 3 and the lining 5, and may be permanently held in place by the rivets 6, which secure the lining to the band. In order to facilitate the application of the wick 7, so as to effect the proper lubrication of the drum 2, the lining 5 is provided with a number of regularly spaced transverse radial slots 5', each having a length equal to the breadth of the wick 7, through which unbroken portions of the wick are inserted, as best shown in Figs. 1 and 7. In the preferred form of the device, the portions of the wick that are passed through the slots 5' are of sufficient length to form relatively broad mushroom-shaped loops or brushes 7'. These loops are arranged to make direct contact with the face 2' of the drum, and when the band 3 is contracted for gripping the drum, the said loops or brushes are crushed flat between said parts, and being saturated with the lubricating oil, the said oil is squeezed out of the wick and loops, and is spread evenly by the latter over substantially the entire surface 2' of the drum. The wick 7 may be of any suitable length, but preferably extends substantially the full length of the lining 5, after allowing for the forming of the loops 7', as shown in Fig. 1. The wick 7 being disposed between the band 3 and the lining 5, tends to space said parts sufficiently to allow the lubricating oil to enter between said parts, where the oil is readily absorbed by the wick. The provision of the wicks 7 and the loops 7' ensures the proper and continuous lubrication of the drum 2, which effectually prevents the burning and glazing of the lining 5, and relieves the transmission mechanism of all vibrations heretofore caused by the chattering of the bands, as described. Band linings equipped with my wicks, when otherwise properly constructed and applied, generally last three or four months longer than any other form or style of band-lining known to me. Owing to the absorbent nature of the wicks 7, the latter retain the lubricating oil until the bands 3 are clamped tightly against the drums, and during these clamping periods, the brushes 7' evenly distribute the oil where it is needed the most. When the pressure of the bands is relaxed, the wicks 7, also being relieved of the pressure, readily and quickly absorb a fresh supply of the lubricating oil, and so on.

Having thus described my invention, what I claim, is—

1. The combination with a transmission band, of a pliable fibrous lining surrounded and supported by the band, said lining having transverse slots, and a tape-like wick overlying the lining and spacing the same from the band, said wick adapted to be saturated with lubricating oil and portions thereof being woven through said slots and formed into mushroom-like loops adapted to spread the lubricant over the periphery of the transmission drum.

2. In a transmission mechanism, a rotatable drum and a band encircling the drum, of a flexible lining interposed between the band and the drum and movable with the band, said lining having a number of spaced openings, and an oil-bearing wick mounted on the outer face of the lining and separating the lining from the band, and portions of said wick being passed through said openings for forming compressible brushes adapted to evenly and continuously spread the oil over the periphery of the drum.

3. A lining for transmission bands, comprising a flexible non-metallic strip adapted to be mounted on the inner face of the band, said strip having a plurality of radial openings, a wick adapted to absorb lubricating oil overlying the outer face of the lining and spacing the lining from the band, and portions of said wick adjacent said openings being woven through the lining for forming brushes adapted to yield the lubricating oil whenever the said brushes are compressed by the contraction of the drum.

In testimony whereof I affix my signature.

LESLIE A. APPLEBY.